United States Patent [19]

Madany

[11] Patent Number: 5,922,050
[45] Date of Patent: *Jul. 13, 1999

[54] METHOD AND APPARATUS FOR CONTROLLING A DEVICE ON A NETWORK

[75] Inventor: Peter W. Madany, Fremont, Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/678,400

[22] Filed: Jul. 2, 1996

[51] Int. Cl.$^6$ .............................. G06F 13/38; G06F 15/17
[52] U.S. Cl. .................... 709/222; 395/712; 340/825.25; 709/202
[58] Field of Search ......................... 395/200.52, 200.47, 395/200.32, 200.5, 200.58, 830, 831, 200.51, 651, 652, 653, 712; 340/825.08, 825.06, 825.07, 825.24, 825.25, 825.54; 702/119

[56] References Cited

U.S. PATENT DOCUMENTS

| 4,633,466 | 12/1986 | Laws et al. ............................... 371/16 |
| 4,646,298 | 2/1987 | Laws et al. . |
| 5,109,484 | 4/1992 | Hughes et al. . |
| 5,142,680 | 8/1992 | Ottman et al. . |
| 5,420,573 | 5/1995 | Tanaka et al. ...................... 340/825.24 |
| 5,488,357 | 1/1996 | Sato et al. . |
| 5,570,085 | 10/1996 | Bertsch . |
| 5,579,482 | 11/1996 | Einkauf et al. ....................... 395/200.5 |
| 5,630,059 | 5/1997 | Brady et al. . |
| 5,655,081 | 8/1997 | Bonnell et al. ..................... 395/200.32 |
| 5,666,501 | 9/1997 | Jones et al. ........................ 395/200.52 |
| 5,734,822 | 3/1998 | Houha et al. ......................... 395/200.5 |
| 5,761,421 | 6/1998 | Van Hoff et al. .................. 395/200.58 |

Primary Examiner—Mark H. Rinehart
Attorney, Agent, or Firm—Blakely Sokoloff Taylor & Zafman

[57] ABSTRACT

A system for controlling a device using a computer coupled to the device through a communication medium. The device contains an program code capable of generating control signals used by the device. A message is broadcast from the device across the communication medium indicating the existence of the device on the communication medium. The computer requests transmission of the device program code across the communication medium. The device then transmits the program code from the device to the computer. The program code is executed by the computer to generate control signals for controlling the device.

18 Claims, 6 Drawing Sheets

METHOD AND APPARATUS FOR CONTROLLING A DEVICE ON A NETWORK

BACKGROUND OF THE INVENTION

1. Field of the Invention

The present invention provides a system for permitting low-cost devices to be controlled by programs contained in the device.

2. Background

Various devices are available which include embedded control programs and processing hardware to execute the programs. These devices may contain small computers having a processor and memory or storage for executing the programs stored within the device. Typically, this computing hardware is provided in moderately or higher-priced devices. It is not commercially feasible to provide embedded computer hardware which is several times greater than the typical selling price of the device. For example, embedding $50.00 of computer hardware in a $10.00 device is not likely to be commercially feasible.

Although low-performance computer hardware may be embedded in a device at a low cost, this low-performance hardware may not be capable of executing programs written in programming languages requiring significant processing capabilities. Programs written in high level programming languages, such as object-oriented languages, may not be capable of execution by inexpensive computer hardware which lacks significant processing ability.

Various devices may be interconnected with other devices or computers across a network or other communication medium. These devices include low-cost items such as light switches and door locks as well as more expensive items such as televisions and VCRs. By interconnecting various devices, a particular device may be controlled manually by a user, or may be controlled automatically by another device or computer coupled to the communication medium. To accomplish this control, the low-cost device must contain a sufficient amount of processing hardware to communicate across the communication medium and control operation of the device itself. However, this level of hardware may not be sufficient to execute programs written in high level programming languages which may be necessary to control operation of the device. As discussed above, the addition of hardware sufficient to execute such programs may increase the cost of the device to a point where the device is not competitive.

A specific programming language capable of controlling consumer devices is the JAVA™ programming language environment developed by Sun Microsystems™ Inc. of Mountain View, Calif. Sun, Sun Microsystems, the Sun logo, and JAVA are trademarks or registered trademarks of Sun Microsystems Inc. in the United States and other countries. JAVA is an object-oriented and architecture-neutral programming language environment. Thus, while other computer languages must be compiled for a particular processor, JAVA programs are interpreted such that a single JAVA program may be used on a variety of processors. Alternatively, JAVA programs may be compiled using a just-in-time (JIT) compiler. The JIT compiler converts the JAVA code to the processor's native code shortly before the compiled code is needed by the processor.

JAVA programs may be executed on any computer platform that supports a JAVA virtual machine (the JAVA virtual machine executes JAVA byte-codes). However, as with other high level languages, the minimum computing resources and memory requirements for a device capable of executing a JAVA program would increase the price of a low-cost device beyond commercial feasibility.

Therefore, a mechanism is necessary to permit a low-cost device to be controlled by an application program requiring a significant amount of computing hardware, yet maintaining a relatively low cost for the device.

SUMMARY OF THE INVENTION

Embodiments of the present invention provide a system for permitting low-cost devices to be controlled by programs contained within the device. Although the low-cost device contains processing hardware and a program or applet for controlling the device, the device's processing hardware is incapable of executing the program. The invention transmits the program stored on the device across a network or communication medium to a computer capable of executing the program. The computer executes the program and generates control signals for controlling the device. The invention maintains the low cost of the device while permitting control of the device by a program incapable of execution by the device itself.

An embodiment of the invention provides a device containing a program code capable of generating control signals used by the device. The device then transmits the program code from the device to the computer. The program code is then executed by the computer to generate control signals for controlling the device.

Another feature of the invention provides a unique identification associated with each device. This unique identification is included in a broadcast message.

A particular embodiment of the invention provides a program code written in the JAVA programming language environment.

BRIEF DESCRIPTION OF THE DRAWINGS

Embodiments of the present invention are illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and circuits have not been described in detail so as not to obscure the invention.

Embodiments of the present invention provide a system for permitting low-cost devices to be controlled by programs contained within the device. Although the low-cost device contains processing hardware and a program or applet stored in the device, the device's processing hardware is incapable of executing the program. Embodiments of the invention transmit the program stored on the device across a network or communication medium to a computer capable of executing the program. The computer executes the program and provides control signals to the device which are received and implemented by the device's internal processing hardware. Thus, the low cost of the device is maintained while permitting the device to be controlled by a program incapable of execution by the device itself.

Figure 1:
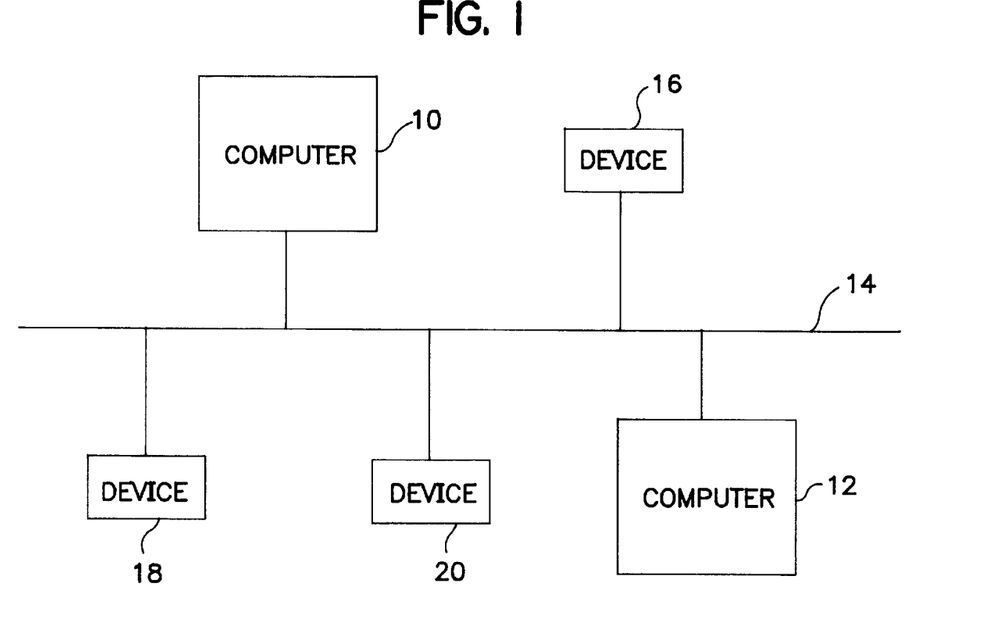
FIG. 1 illustrates an arrangement of multiple computers and multiple devices coupled to a network.

FIG. 1 illustrates an arrangement of multiple computers and multiple devices coupled to a network. In particular, a first computer 10 and a second computer 12 are coupled to a network (or communication medium) 14. Similarly, three devices 16, 18, and 20 are coupled to network 14. Throughout this specification, the terms "network" and "communication medium" are used synonymously to describe any type of cable, wire, or other transmission medium capable of transmitting data. Additionally, network 14 may be a radio-frequency communication system for transmitting signals and data between various devices and computers. Network 14 may also be a single point-to-point communication link between a device and a computer. In a particular embodiment of the invention, network 14 includes the wiring in a building used for the distribution of electrical power. Additional details regarding this embodiment are provided below with respect to FIG. 7.

Computers 10 and 12 may be any type of computer, including a personal computer or network computer, capable of executing programs or applets stored on devices 16–20. Additional details regarding these applets are provided below.

Figure 2:
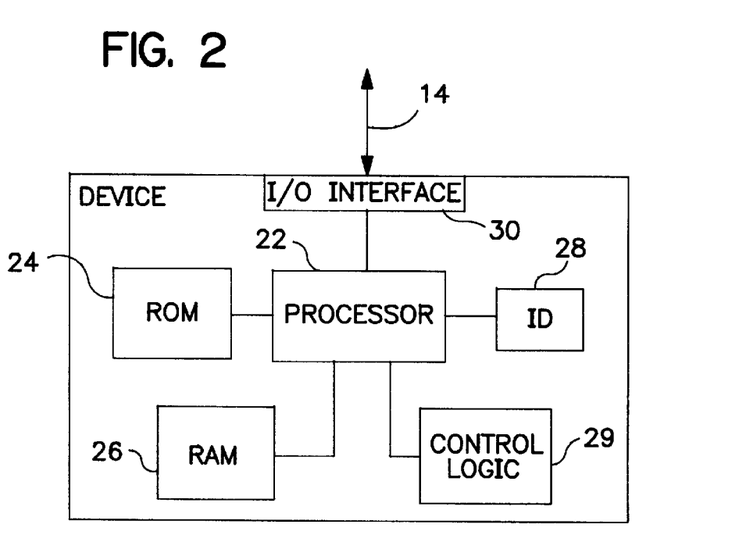
FIG. 2 is a block diagram of an embodiment of a device as shown in FIG. 1.

FIG. 2 is a block diagram of an embodiment of a device as shown in FIG. 1. The device may be anything containing sufficient hardware and software resources to perform the operations described below. Such devices include, but are not limited to, light switches, televisions, radios, door locks, computers, and the like.

The device shown in FIG. 2 includes a processor 22, a read only memory (ROM) 24, and a random access memory (RAM) 26. Processor 22 may be an inexpensive processor capable of performing basic control functions and communication functions across the network. Similarly, ROM 24 and RAM 26 may be relatively small to reduce the overall cost of the device. ROM 24 and RAM 26 must have capacity sufficient to store a program or applet, a communication program for communicating with the network, and a program for interacting with the various features of the device. Control logic 29 is coupled to processor 22 and provides control of the features contained in the device. For example, if the device is a light switch, processor 22 may provide a signal to control logic 29 requesting that the switch be turned off. In response to this signal, control logic 29 performs the operations necessary to turn off the light switch.

The device shown in FIG. 2 may also include an identification device 28, such as an electronic serial number chip, coupled to processor 22. Electronic ID 28 provides a unique identification, or address, for each device coupled to network 14. This unique identification provides a mechanism for distinguishing one device from another when multiple devices are coupled to the same network 14. Alternatively, identification device 28 may be a user-configurable device such as a DIP switch or similar selection mechanism. Furthermore, the unique identification may be stored within ROM 24 or incorporated into the software used to control the device.

An input/output interface 30 is coupled between network 14 and processor 22. I/O interface 30 provides the mechanism for transmitting signals between processor 22 and network 14. Although processor 22, ROM 24, RAM 26, ID 28, control logic 29, and interface 30 are illustrated in FIG. 2 as separate components, several or all of these components may be contained in a single integrated circuit.

ROM 24 contains various programs necessary to control and operate the device. An I/O control program stored within ROM 24 is capable of performing the operations necessary to communicate through interface 30 across network 14. This I/O control program is executed by processor 22 and, therefore, may be written in the native language of the processor. The I/O control program is also capable of interacting with sensors or controls in the device.

ROM 24 also includes a program or applet containing information regarding the features of the device and instructions for providing control signals to the device. The applet contains all information necessary to describe, control, and communicate with the device. This applet cannot be executed by processor 22 due to the inadequate processing resources of the processor. Instead, the applet is executed by a computer coupled to network 14 having sufficient computing resources. Additional details regarding the execution of the applet by a computer are provided below.

In one embodiment of the invention, the applet contained within ROM 24 is written in the JAVA programming language environment. By using an architecture-independent language such as JAVA, the applet may be executed on any type of computer and any type of processor. Therefore, a single device may be manufactured without regard to the type of computer or processor to which it will be connected. Additionally, the device may continue to be supported by new processors developed in the future.

Figure 3:
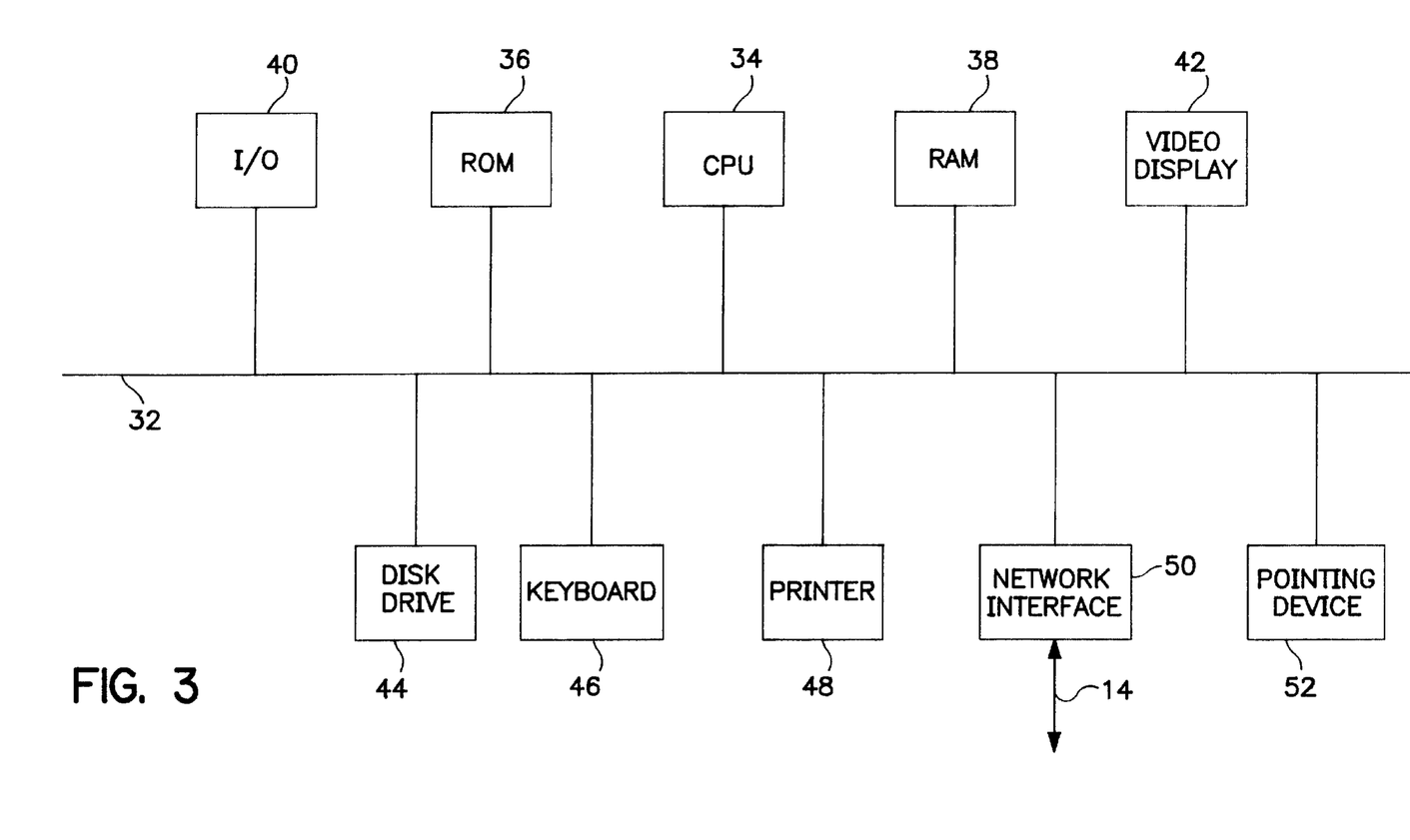
FIG. 3 illustrates an embodiment of a computer as shown in FIG. 1.

FIG. 3 illustrates a particular embodiment of a computer capable of executing an applet stored in a device. The computer may be a general purpose computer or a system specifically adapted to controlling devices of the type illustrated in FIG. 2. The components shown in FIG. 3 are provided by way of example, and certain components may be deleted for any particular implementation of the invention. FIG. 3 illustrates a system bus 32 to which the system components are coupled. A central processing unit (CPU) 34 performs the processing tasks of the computer. A ROM 36 and a RAM 38 are coupled to bus 32, and provide a storage mechanism for various data. Alternatively, ROM 36 and RAM 38 may be coupled directly to CPU 34.

An input/output device 40 is coupled to bus 32 along with a video display 42. Video display 42 is used to display various information and data to the user of the computer. A disk drive 44 is provided for long term storage of information by the computer system. A keyboard 46 and a pointing device 52 are provided for entering information and commands to the computer system. A printer 48 is used to create a hard copy of information generated and stored by the computer. A network interface 50 is coupled between bus 32 and network 14, and provides a mechanism for transferring information between the computer system and other devices and computers coupled to network 14.

Figure 4:
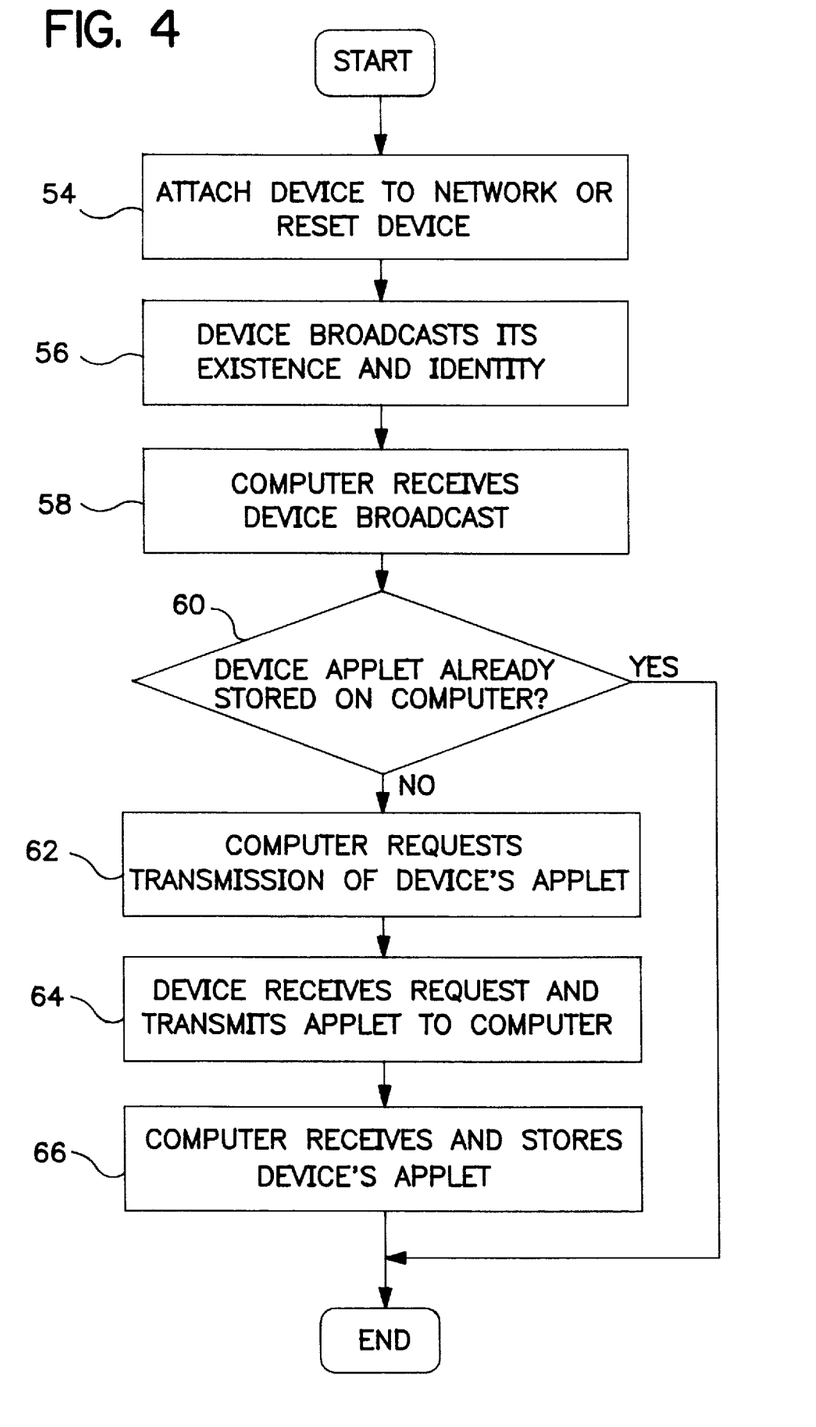
FIG. 4 is a flow diagram illustrating a procedure for initializing a device in accordance with the teachings of the present invention.

FIG. 4 illustrates a flow diagram of the procedure used when initializing a device. At step 54, the device is attached to the network or the device is reset. At step 56, the device broadcasts a message indicating its existence and identity across network 14. This broadcast includes information regarding the device's unique identification (or address), as well as the device's availability for accepting commands and signals from computers coupled to network 14. At step 58, the computer receives the broadcasted information from the device. If multiple computers are coupled to the network, then each computer will receive the device's broadcast.

At step 60 of FIG. 4, each computer receiving the device broadcast determines whether the device applet for the broadcasting device is already stored on the computer (e.g., on a cache, disk drive or other storage mechanism). If the applet for the broadcasting device has already been stored on the computer, then the procedure terminates without any further action. The applet may already be stored due to a previous reset and initialization of the device. In this situation, the initialization procedure terminates because the computer already contains the necessary applet and associated information for the broadcasting device.

If the device applet is not already stored on the computer at step 60, then the procedure continues to step 62 where the computer requests transmission of the device's applet. If multiple computers request transmission of the applet in response to the same broadcast, the device will respond to the first request received. After handling the first request, the device may then transmit the applet to other requesting computers.

At step 64, the device receives the request from the computer and transmits its applet and associated information to the computer. As discussed above with respect to FIG. 2, the applet may be stored in ROM 24 within the device. In addition to the applet itself, additional information may be associated with the applet and transmitted to the computer. This additional information may include an icon associated with the device for representing the device in a graphical user interface provided by the computer. Similarly, other graphical information may be associated with the applet for use by the computer, as well as any additional information necessary for the computer to execute the applet and properly control the features of the device.

At step 66, the computer receives and stores the device's applet and associated information. Once the device's applet has been received and stored, the computer may execute the applet, thereby providing control of the device by the user of the computer.

If a device is attached to a network or reset during a period when no active computers are coupled to the network, then the initialization procedure of FIG. 4 will not be completed. Although the device will broadcast its identity and existence, no active computer will receive or respond to the broadcast. If a computer is later activated or coupled to the network, then the device must be reset or otherwise caused to broadcast its identity and existence (step 56 of FIG. 4). In this manner, the computer will receive the broadcast from the device and determine whether to request transmission of the device's applet.

Alternatively, the computer may broadcast a signal across the network requesting that each device broadcast its identity. In response to the received device identities, the computer may request the transmission of device applets not yet stored on the computer.

An embodiment of the invention includes a mechanism for providing device identifications to the computer directly. This mechanism is useful if a new computer is added to the network or an existing computer fails to maintain previously stored information regarding the devices in the network. A user may enter the device identifications directly into the computer, or the identifications may be provided from a diskette or other storage medium. The list of identifications may be provided by an existing computer on the network or saved during a previous session. Once the computer has been provided with the list of device identifications, the computer then generates a request for each device to transmit its applet.

The transmission of data across network 14 between devices and computers may be accomplished using various data transmission protocols. Generally, the amount of data transmitted across network 14 is relatively small. Therefore, a significant bandwidth is not required on network 14. The peak data flow generally occurs when one or more new devices are added to the network, thereby requiring transmission of the applet from the device to the computer. Protocols such as XModem, Ymodem, and Kermit may be used to transfer data between the device and the computer.

Figure 5:
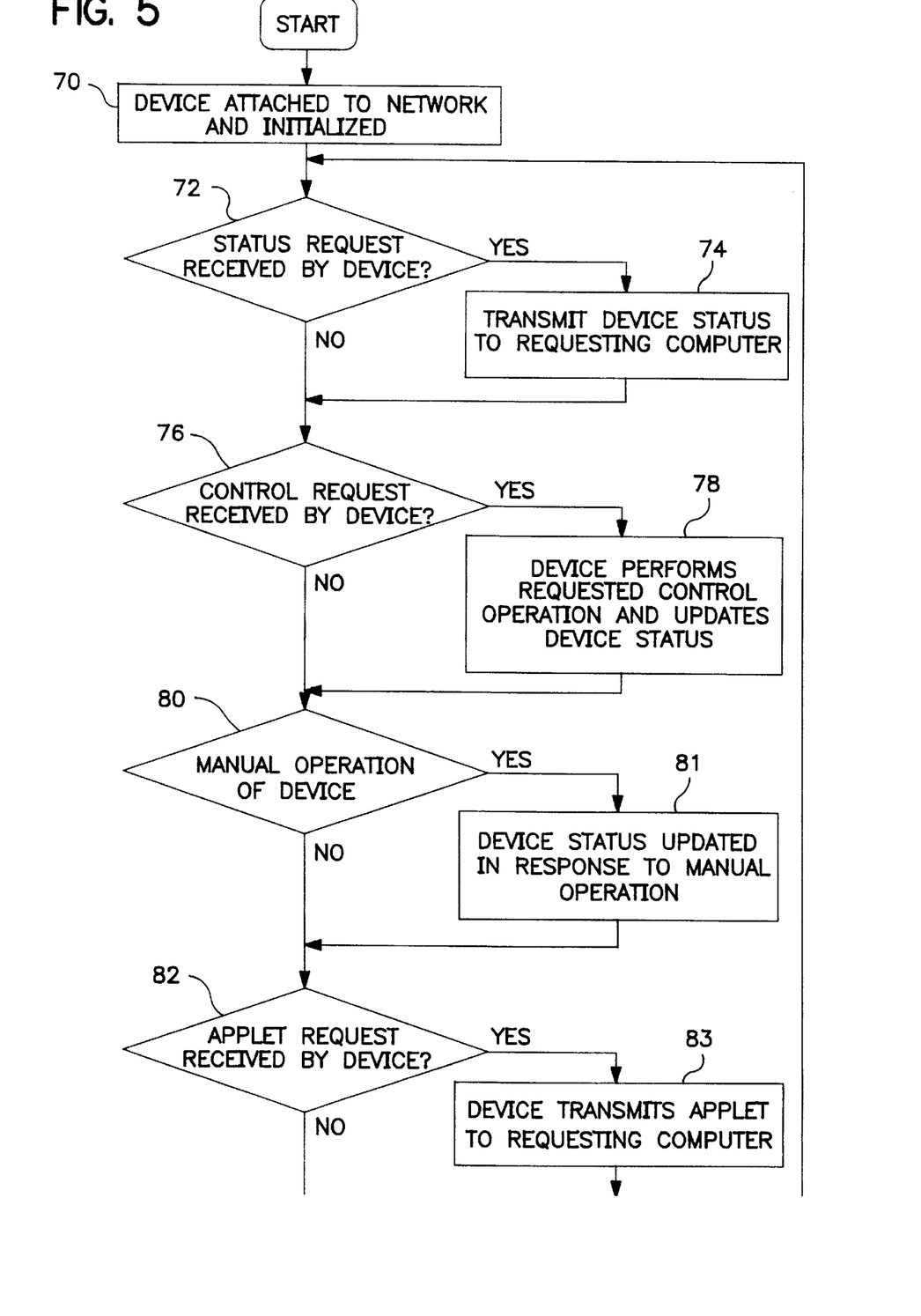
FIG. 5 is a flow diagram illustrating operation of a device according to the teachings of the invention.

FIG. 5 is a flow diagram illustrating the operation of a device of the type illustrated in FIGS. 1 and 2. At step 70, the device is attached to the network and initialized according to the procedures described above with respect to FIG. 4. At step 72, the device determines whether a status request has been received by the device. Status requests are generated by a computer coupled to the network and request information regarding the device's current status; e.g., ON or OFF. If a status request has been received at step 72, then the device transmits the requested device status information to the requesting computer at step 74.

The procedure then continues to step 76 where the device determines whether a control request has been received by the device. Control requests are generated by a computer coupled to the network and request that the device perform a function or otherwise change its status (change device status to ON or OFF, change device Volume, etc.) If a control request has been received at step 76, then the device performs the requested control operation and updates its device status at step 78.

The procedure then continues to step 80 where the device determines whether a manual operation of the device has occurred. A manual operation may override the status of the device set by the computer. For example, the computer may request that the device turn itself off. Later, a user may manually turn the device on, thereby overriding the computer's request. If a manual operation is detected at step 80, then step 81 updates the device's status in response to the manual operation.

The procedure of FIG. 5 continues to step 82 where the device determines whether an applet request has been received from a computer on the network. If an applet request has been received at step 82, then the device transmits the applet to the requesting computer at step 83. The procedure then returns to step 72 to test for a received status request. The procedure of FIG. 5 repeats steps 72, 76, 80, and 82 to continuously identify status requests, control requests, manual operations, and applet requests.

Figure 6:
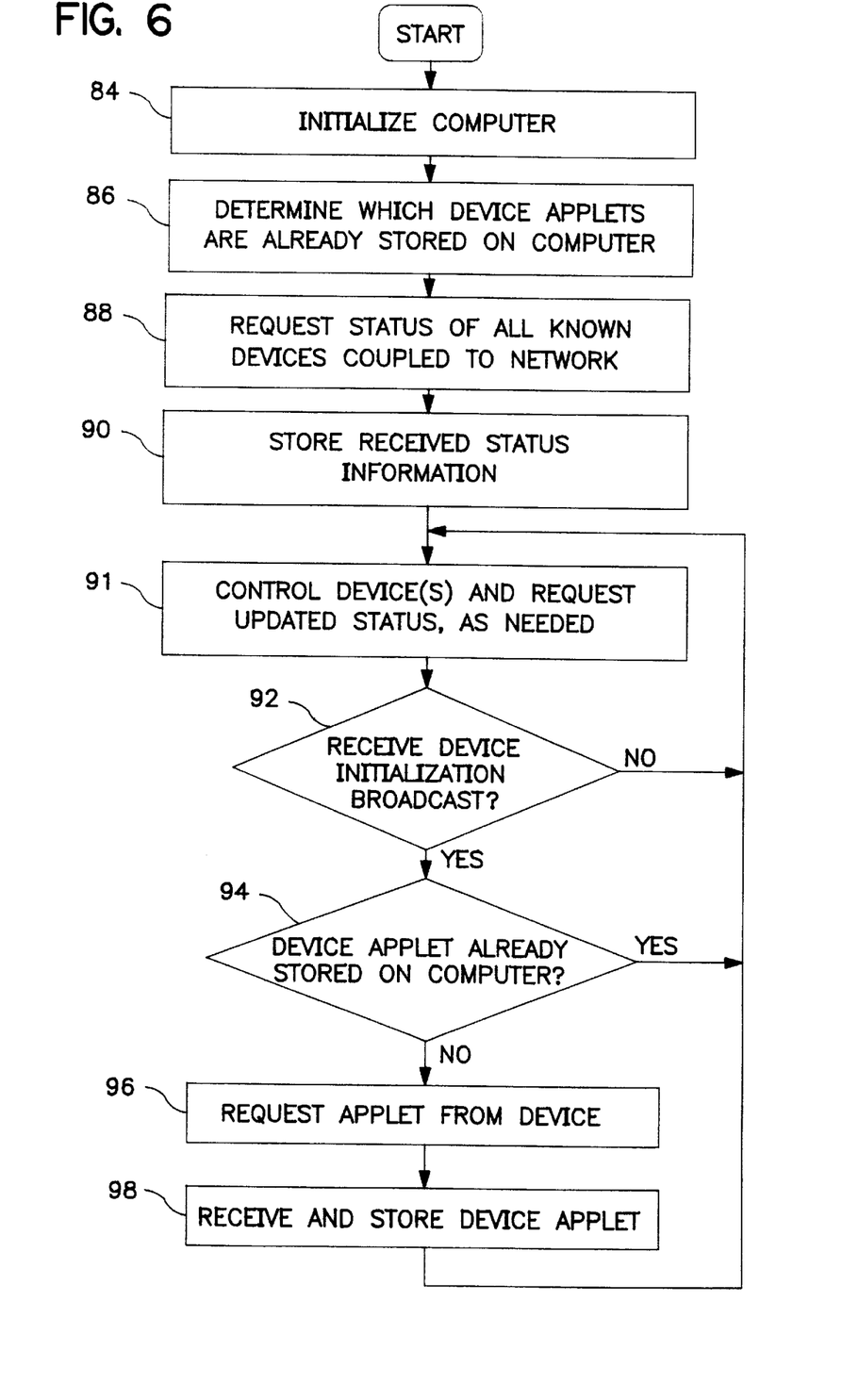
FIG. 6 is a flow diagram illustrating operation of a computer in accordance with the teachings of the invention.

FIG. 6 is a flow diagram illustrating the operation of a computer of the type illustrated in FIGS. 1 and 3. At step 84, the computer is initialized; i.e., powered up or otherwise attached to the network. At step 86, the computer determines which device applets are already stored in the computer. At step 88, the computer requests the status for all known devices coupled to the network. At step 90, the computer stores the status information received from the devices. At this point, the computer has "learned" the status of all known devices attached to the network. However, as discussed above, devices added to the network while the computer was not actively coupled to the network must repeat the initialization procedure of FIG. 4. This causes the computer to receive the broadcast from the device and request the device's applet, if necessary.

At step 91 of FIG. 6, the computer generates signals to control devices and request updated device status, as needed. At step 92, the computer determines whether a device initialization broadcast has been received. If no device broadcast has been received, then the procedure returns to step 91, thereby repeatedly generating control signals (if needed), requesting device status (if needed), and testing for device initialization broadcasts.

When a device initialization broadcast is received at step 92, the routine continues to step 94 to determine whether the applet for the broadcasting device has already been stored in the computer. If the device's applet has already been stored, then the routine returns to step 91. If the applet has not yet been stored in the computer, then step 96 transmits a request to the broadcasting device requesting the device transmit its applet to the computer. At step 98, the computer receives and stores the device's applet and returns to step 91.

Figure 7:
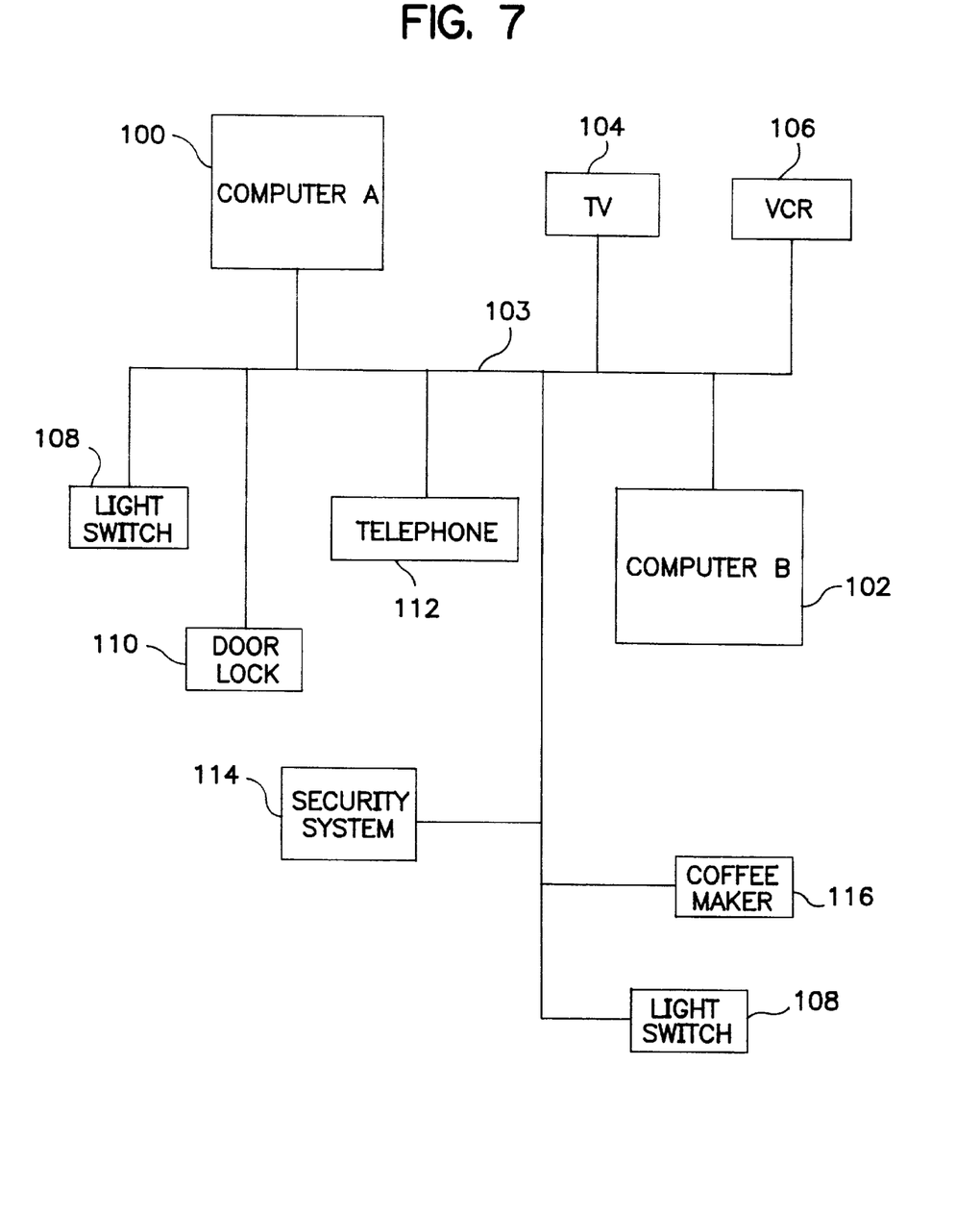
FIG. 7 illustrates an exemplary network environment containing multiple computers and multiple devices coupled to one another.

FIG. 7 illustrates an exemplary network environment containing multiple computers and multiple devices. Specifically, a first computer 100 and a second computer 102 are coupled to a network 103. In this example, network 103 is the electrical wiring provided throughout a building, such as a house. The electrical wiring is used to transmit electricity throughout the house and transmit signals between computers and devices. Multiple devices are coupled to the house wiring 103, thereby interconnecting computers 100 and 102 with the multiple devices. For example, a television 104 and a video cassette recorder (VCR) 106 are both coupled to wiring 103. Similarly, two light switches 108 are illustrated in FIG. 7 as being coupled to wiring 103. Additionally, a door lock 110, a telephone 112, a security system 114, and a coffee maker 116 are coupled to wiring 103. Each device 104–116 contains a processor, ROM, and other components as shown and described with respect to FIG. 2.

After connecting a device to wiring 103, the device broadcasts its existence and identity across the wiring to be received by computers 100 and 102. Computers 100 and 102 may then request transmission of the device's applet from the device to the computer if the computer has not already received and stored the applet. Once the applet has been received and stored by the computer, the computer may periodically transmit status requests to monitor the status of each device connected to wiring 103. Each device 104–116 shown in FIG. 7 is initialized and monitored in the same manner by one or both computers 100, 102.

After the devices 104–116 have been initialized and their applets transmitted to computers 100 and/or 102, the computers are capable of controlling each of the devices. For example, computer 100 may sense the manual unlocking of door lock 110 (by monitoring its status) and, in response, activate light switch 108 to turn on the lights in the room adjacent the door being unlocked. Similarly, computer 102 may activate coffee maker 116 using the coffee maker's applet (stored in computer 102) to issue the appropriate control signals to the coffee maker at the appropriate time.

As shown in FIG. 7, multiple computers may be coupled to the same network. In such a system, each computer may monitor and control each device coupled to the network. Therefore, it is not necessary to "assign" each device to a particular computer in the network.

In the preferred embodiment of the invention, the applets are written using the JAVA programming language. Therefore, any computer capable of executing JAVA programs is capable of executing device applets. Thus, in a network having multiple computers, the computers may have different computer architectures based on different microprocessors, yet still execute the same applets.

In an embodiment of the invention, the computers coupled to the network utilize an operating system providing a graphical user interface (GUI). As discussed above, each device applet may have an associated icon and other graphical information for displaying the device graphically on the computer's video display. Thus, in the example of FIG. 7, the devices 104–116 may be displayed graphically on the video display of one or both computers 100, 102. The computer may display a drawing of the house with the various devices positioned at their respective locations within the house. Additionally, the status of each device may be determined by its icon (e.g., light switch ON or light switch OFF) or textual information adjacent the icon. This graphical representation provides a simple interface for the user to monitor and control the various devices.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the invention as defined by the appended claims in view of their full scope of equivalence.

What is claimed is:

1. A method of providing control of a device using a computer coupled to said device through a communication medium, said device containing a program code, said method comprising the steps of:

transmitting said program code under control of said device from said device to said computer, wherein said device is unable to execute said program code, said program code is able to control said device; and executing said program code on said computer to generate control signals for controlling said device.

2. The method of claim 1 further including the step of broadcasting a message for determining the existence of devices coupled to said communication medium.

3. The method of claim 2 wherein said broadcast message includes a unique identification associated with said device.

4. The method of claim 1 further including the step of requesting transmission of said program code across said communication medium, said request transmitted across said communication medium by said computer.

5. The method of claim 1 wherein a plurality of devices are coupled to said computer through said communication medium, wherein each device contains a program code capable of controlling the device.

6. The method of claim 1 further including the step of manually operating said device to override said control signals generated by said computer.

7. The method of claim 1 further including the step of transmitting status requests from said computer to said device, said device transmitting a device status signal to said computer in response to said status request.

8. The method of claim 1 wherein said device changes its status in response to said control signals generated by said computer.

9. The method of claim 1 wherein said program code includes information regarding device features and operation of said device.

10. The method of claim 1 wherein said program code is written in the JAVA programming language environment and said computer is capable of executing JAVA program codes.

11. The method of claim 1 wherein said program code is an applet.

12. An apparatus for providing control of a device using a computer coupled to said device through a communication medium, said device containing a program code, said apparatus comprising:

a mechanism configured to transmit said program code from said device to said computer, wherein said device is unable to execute said program code, said program code is able to control said device; and a mechanism configured to execute said program code on said computer to generate control signals capable of controlling said device.

13. The apparatus of claim 12 wherein said program code is written in the JAVA programming language environment and said computer is capable of executing JAVA program codes.

14. The apparatus of claim 12 wherein said device includes a unique identification mechanism.

15. The apparatus of claim 12 further including a mechanism configured to broadcast a message for determining the existence of devices coupled to said communication medium.

16. The apparatus of claim 12 further including a mechanism configured to request transmission of said program code across said communication medium.

17. A computer software product including a medium readable by a processor, the medium having stored thereon:

a first sequence of instructions which, when executed by a processor, causes said processor to receive a program code stored on a device coupled to said processor, wherein said processor is coupled to said device through a communication medium said device is unable to execute said program code, said program code is able to control said device; and a second sequence of instructions which, when executed by a processor, causes said processor to execute said program code to generate control signals for controlling said device.

18. The computer software product of claim 17 wherein said program code is written in the JAVA programming language environment and said processor is capable of executing JAVA program codes.

* * * * *